(12) United States Patent
Valencia Arcila et al.

(10) Patent No.: US 10,940,435 B2
(45) Date of Patent: Mar. 9, 2021

(54) INTEGRATED AFTERTREATMENT SYSTEM

(71) Applicant: Cummins Emission Solutions, Inc., Columbus, IN (US)

(72) Inventors: Juan Manuel Valencia Arcila, Columbus, IN (US); Shane O'Connor, Cottage Grove, WI (US); Michael T. Lynch, Mineral Point, WI (US); Ryan M. Johnson, Cottage Grove, WI (US); Randolph G. Zoran, McFarland, WI (US); Alex A. Bethke, DeForest, WI (US); Victor C. Chew, Columbus, IN (US); Andrew Komisarek, Janesville, WI (US); Michael Bates, Columbus, IN (US); Jack Erickson, Columbus, IN (US); Daniel Edward Novreske, Columbus, IN (US); Ryan Robert Welch, Wauwatosa, WI (US); Chad Carius, Columbus, IN (US); Oscar Chavira, Columbus, IN (US); Brandon Leedy, Oxford, OH (US); Eric R. Butler, Madison, WI (US); William J. Runde, Janesville, WI (US); Bucky Woods, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 0 days.

(21) Appl. No.: 16/810,694

(22) Filed: Mar. 5, 2020

(65) Prior Publication Data

US 2020/0197866 A1   Jun. 25, 2020

Related U.S. Application Data

(62) Division of application No. 15/559,367, filed as application No. PCT/US2016/023786 on Mar. 23, 2016, now Pat. No. 10,632,424.

(Continued)

(51) Int. Cl.
*B01D 53/94* (2006.01)
*F01N 3/28* (2006.01)

(52) U.S. Cl.
CPC ....... *B01D 53/944* (2013.01); *B01D 53/9454* (2013.01); *B01D 53/9495* (2013.01);
(Continued)

(58) Field of Classification Search
CPC ..... F01N 3/28; B01D 53/944; B01D 53/9454; B01D 53/9495; B01D 2258/012
(Continued)

(56) References Cited

U.S. PATENT DOCUMENTS 4,617,176 A   10/1986   Merry
6,591,497 B2   7/2003   Foster et al.
(Continued)

FOREIGN PATENT DOCUMENTS

JP   2013-522524 A   6/2013
JP   2014-527592 A   10/2014
WO   WO-2013/174668 A1   11/2013

OTHER PUBLICATIONS

Final Office Action for U.S. Appl. No. 15/559,367 dated May 15, 2019, 11 pages.
(Continued)

*Primary Examiner* — Tom P Duong
(74) *Attorney, Agent, or Firm* — Foley & Lardner LLP

(57) ABSTRACT

Implementations described herein relate to features for an integrated aftertreatment system. In one implementation, an integrated aftertreatment system comprises a casing that includes a mating flange having a first constant diameter and a catalyst component configured to mate to the mating flange of the casing. The catalyst component includes a canned body including a first portion sized to a second constant diameter to mate with the first constant diameter of the
(Continued)

mating flange. In another implementation, an integrated aftertreatment system comprises a casing, a catalyst component positioned within the casing, a particulate filter having an outer casing with an outlet, and a particulate filter joint coupled to the outer casing of the particulate filter at the outlet. An end of the particulate filter joint is aligned with an end of the particulate filter.

20 Claims, 12 Drawing Sheets

Related U.S. Application Data

(60) Provisional application No. 62/137,706, filed on Mar. 24, 2015.

(52) U.S. Cl.
CPC .......... *F01N 3/28* (2013.01); *B01D 2258/012* (2013.01); *Y02T 10/12* (2013.01)

(58) Field of Classification Search
USPC .................................................. 422/168, 171
See application file for complete search history.

(56) References Cited

U.S. PATENT DOCUMENTS

| | | | |
|---|---|---|---|
| 7,377,038 B2 | 5/2008 | Bowman et al. | |
| 7,452,512 B2* | 11/2008 | Quackenbush | B01D 53/88 |
| | | | 422/171 |
| 7,816,869 B2* | 10/2010 | Morita | H01J 9/02 |
| | | | 313/587 |
| 8,146,252 B2 | 4/2012 | Wirth | |
| 8,763,375 B2 | 7/2014 | Wieland et al. | |
| 2006/0008395 A1 | 1/2006 | Ten Eyck et al. | |
| 2006/0156794 A1 | 7/2006 | Horn et al. | |
| 2007/0033803 A1 | 2/2007 | Lawrukovich et al. | |
| 2007/0144126 A1 | 6/2007 | Ohya et al. | |
| 2008/0069742 A1 | 3/2008 | Toy et al. | |
| 2009/0056319 A1 | 3/2009 | Warner et al. | |
| 2009/0060802 A1 | 3/2009 | Beauharnois | |
| 2015/0121845 A1 | 5/2015 | Wirth et al. | |
| 2016/0244001 A1 | 8/2016 | Chauhan et al. | |

OTHER PUBLICATIONS

International Search Report & Written Opinion for PCT/US2016/023786, dated Aug. 12, 2016, 10 pages.

Non-Final Office Action for U.S. Appl. No. 15/559,367 dated Nov. 8, 2018, 8 pages.

Notice of Allowance for U.S. Appl. No. 15/559,367, dated Dec. 4, 2019.

First Office Action issued for Indian Patent Application No. 201948040438, dated Sep. 22, 2020, 5 pages.

First Office Action issued for Indian Patent Application No. 201948040185, dated Sep. 22, 2020, 5 pages.

Examination Report issued for UK Patent Application No. GB1715327.1 dated Oct. 27, 2020, pp. 1-3.

\* cited by examiner

Sensor Table Feature to Allow for Band Clamp Mounting

Sensor Table Mounting Foot (Bolted Connection)

INTEGRATED AFTERTREATMENT SYSTEM

CROSS-REFERENCE TO RELATED APPLICATIONS

The present application is a divisional of U.S. patent application Ser. No. 15/559,367, filed Sep. 18, 2017, which is a national Stage of PCT Patent Application No. PCT/US2016/023786, filed Mar. 23, 2016, which claims priority to U.S. Provisional Patent Application No. 62/137,706, filed Mar. 24, 2015. The contents of these applications are incorporated herein by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to features for an integrated aftertreatment system.

One implementation relates to an integrated aftertreatment system having a casing that includes a mating flange having a first constant diameter and a catalyst component configured to mate to the mating flange of the casing. The catalyst component includes a canned body including a first portion sized to a second constant diameter to mate with the first constant diameter of the mating flange.

In some particular implementations, the catalyst component includes a catalyst and a mat material. The mat material is positioned between the catalyst and the canned body. The canned body includes a second portion sized to a third diameter that is based on a holding pressure exerted on the catalyst by the mat material. In some implementations, the holding pressure is based on a target gap bulk density for the mat material. In some implementations, the third diameter is less than the second constant diameter. In some implementations, the third diameter has a tolerance of ±3.4 mm. In some implementations, the canned body includes a third portion sized to the third diameter, and the first portion is positioned between the second portion and the third portion. In some implementations, the second portion of the canned body of the catalyst component is upstream of the first portion or downstream of the first portion.

Another implementation relates to an integrated aftertreatment system having a casing, a catalyst component positioned within the casing, a particulate filter having an outer casing with an outlet, and a particulate filter joint coupled to the outer casing of the particulate filter at the outlet. An end of the particulate filter joint is aligned with an end of the particulate filter.

In some particular implementations, the particulate filter joint includes a bead. In some implementations, the particulate filter joint is welded to the outer casing of the particulate filter. In some implementations, the particulate filter joint reduces an overall length of the integrated aftertreatment system relative to an integrated joint.

Yet another implementation relates to an integrated aftertreatment system having a first casing, a first component positioned within the first casing, a second casing, a second component positioned within the second casing, and a flared ring fixedly coupled to the first casing at a first end and coupled to the second casing at a second end opposite the first end. The flared ring having a constant diameter portion extending from the first end to a flared portion at the second end. The flared ring also includes a sensor coupling fixed to the constant diameter portion.

In some particular implementations, the sensor coupling is a pressure coupling or temperature coupling. In some implementations, the first component is a diesel oxidation catalyst and the second component is a particulate filter. In some implementations, the flared ring is welded to an outer portion of the first casing.

Still another implementation relates to an integrated aftertreatment system having a casing, a catalyst positioned within the casing, and a sensor mount coupled to an outer portion of the casing.

In some implementations, the sensor mount may include an integrated sensor harness and module alignment component. The integrated sensor harness and module alignment component includes rigid attachment points to couple to the outer portion of the casing. In some implementations, the sensor mount may include two or more tiers. In some implementations, the sensor mount may include both attachment openings and a strap attachment channel.

Still a further implementation relates to an integrated aftertreatment system having a casing, a catalyst positioned within the casing, and a pressure sensor assembly coupled to the casing. The pressure sensor assembly includes a tapered tube coupled at a first end to a pressure sensor module and coupled at a second end to a coupling of the casing. The first end has a smaller diameter than the second end.

In some particular implementations, the tapered tube is configured to drain water out from the tapered tube.

A further implementation relates to an integrated aftertreatment system having a casing, a catalyst positioned within the casing, and an electrical connector having a sealant within a backshell of the electrical connector.

In some particular implementations, the sealant is RTV. In some implementations, the backshell of the electrical connector is formed from polyurethane.

Another implementation relates to a mold for sealing an electrical connector from a curing mold material that includes a first cavity for an electrical wire and a second cavity for an electrical connector. The second cavity includes an upper lip and a lower lip to form a small tolerance opening between the first cavity and the second cavity when the mold is closed and the electrical wire is coupled to the electrical connector.

In some particular implementations, the second cavity is formed from an upper removable component and a lower removable component, the upper removable component including the upper lip and the lower removable component including the lower lip.

BRIEF DESCRIPTION

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for an integrated aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some systems, an integrated aftertreatment system may reduce the size of the system, decrease the costs by reducing the number of parts, and simplify designing needs by having a consistent configuration and reducing the footprint of the system. An integrated aftertreatment system may include a number of aspects including sealed electrical connector backshells, variable sizing to facilitate catalyst retention and welding of mating components, integrated sensor harness and aftertreatment system module alignment and sensor bracket locating features, a diesel particulate filter outlet mounting ring recessed to allow closer assembly of subsystems, a flare ring coupling to eliminate placement of the coupling in transition zone, a stackable sensor module mount, tapered pressure sensor tubes to enable better water drainage, and/or a dual mounting sensor table.

II. Overview of Aftertreatment System

Figure 1:
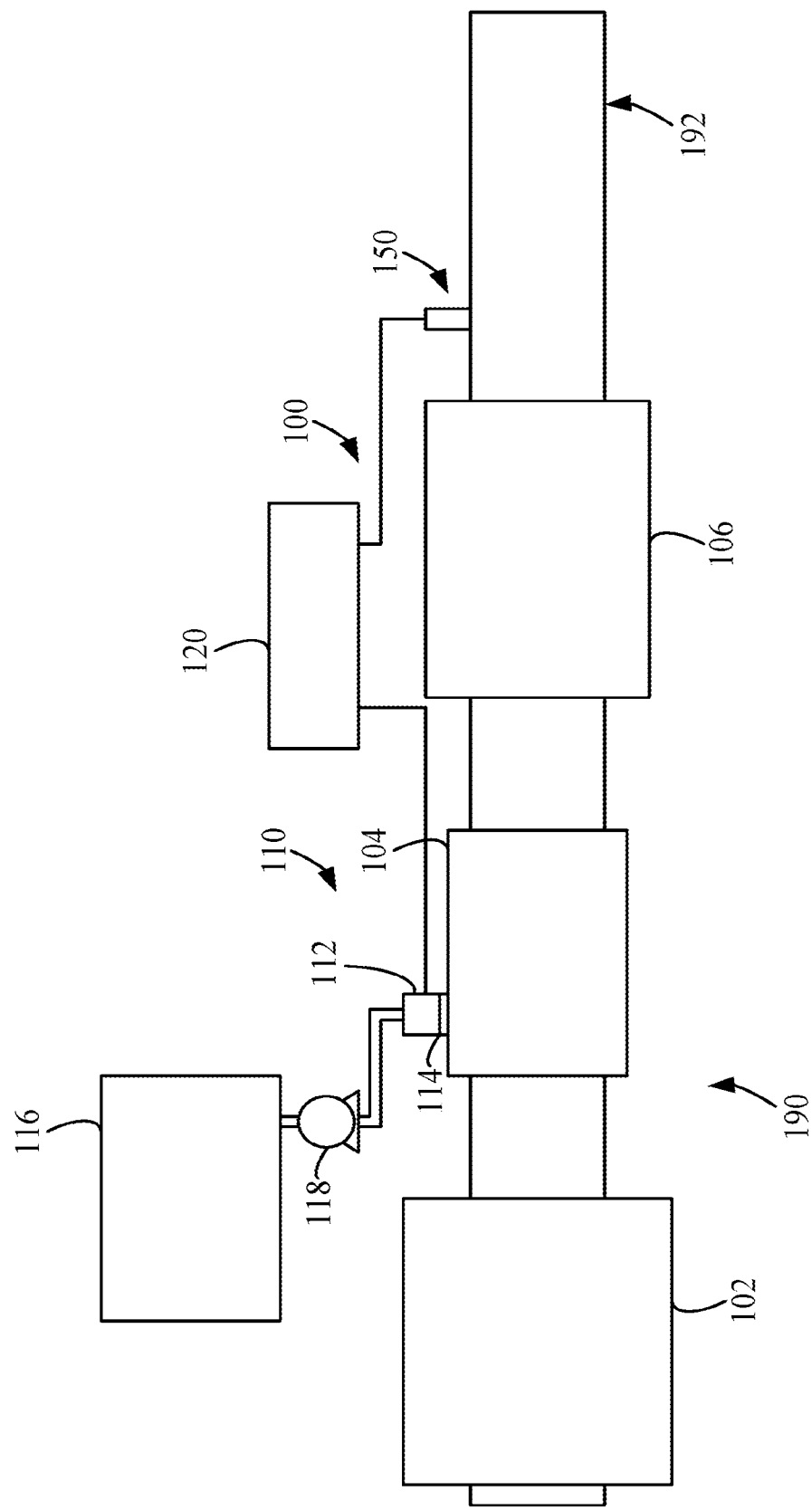
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as an aqueous urea or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA. etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

The aftertreatment system 100 may be formed into an integrated aftertreatment system having one or more of the following features.

III. Example Sealed Connector Backshell

Figure 2:
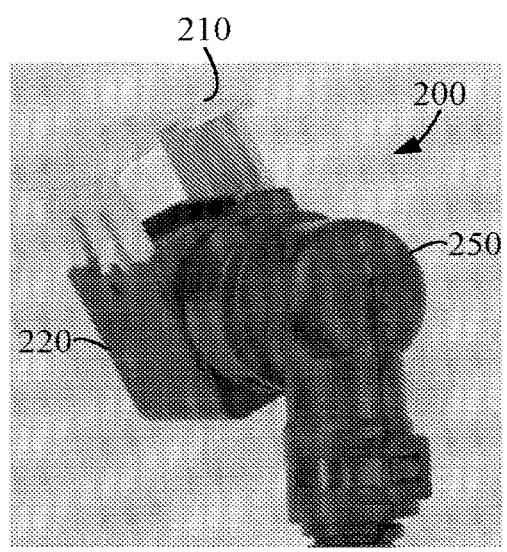
FIG. 2 is a perspective view of an example connector.
Figure 3:
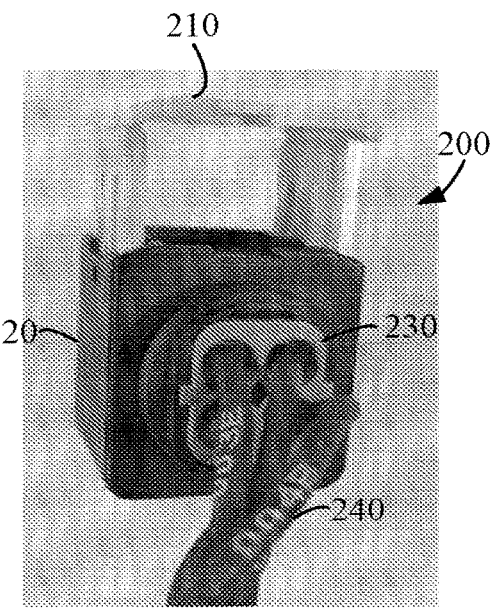
FIG. 3 is another perspective view of an example connector.
Figure 4:
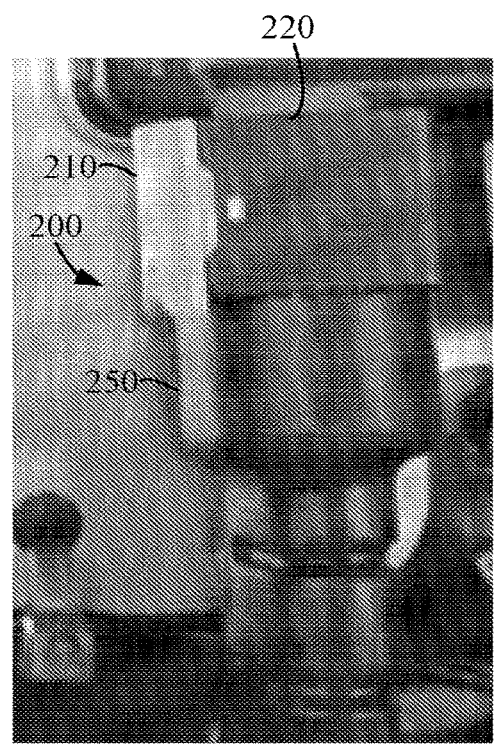
FIG. 4 is yet another perspective view of an example connector.
Figure 5:
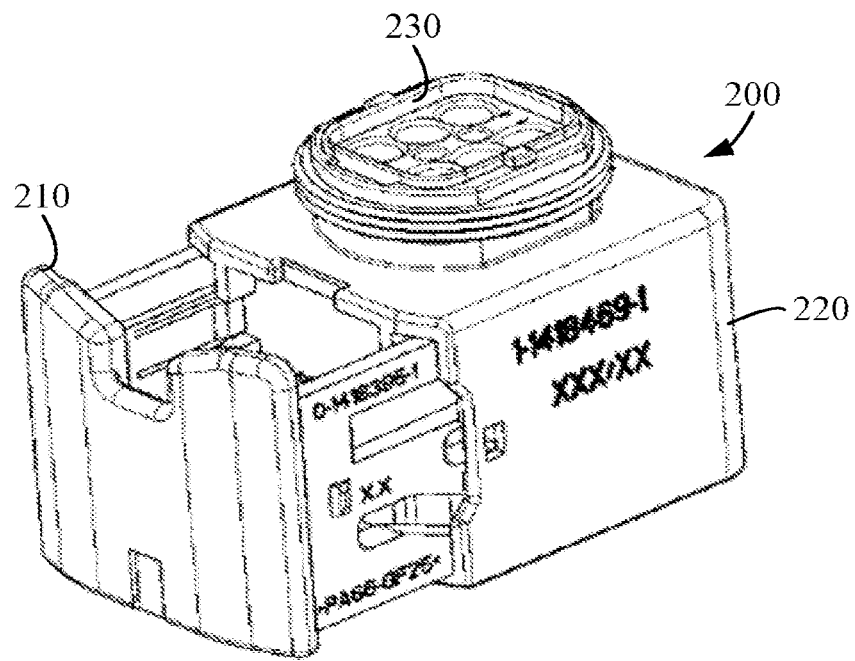
FIG. 5 is a perspective schematic view of an example sealed connector backshell.

FIGS. 2-4 depict an example electrical connector backshell 200 having a thin plastic two piece construction 210, 220 that may be susceptible to exposure to the environment. The electrical connector backshell 200 houses an electrical connector 230 to which one or more electrical wires 240 are coupled. In harsh conditions, the connector electrical contacts and component corrosion may occur and eventually result in failure of the connector and/or component. Some electrical connector backshells 200 incorporate an exterior cover 250 formed from polyurethane, such as two part elastofoam and elastocast, foam material which is injected as a two part liquid into a mold that covers the harness and isolates the connector 230 contacts from the environment. In some implementations, BASF 2 part elastofoam 4610/101 Resin and/or elastocast 70604T Isocyanate may be used. It may be useful to further seal the connectors 230 by sealing the cavities for the contacts such that, when the polyurethane foam is injected into the mold, the mold material is substantially prevented from contaminating the connector 230 and/or the connector electrical contacts, interfering with the locking mechanism of the connector, and/or interfering with the insertion of the connector 230 into a mating connector. FIG. 5 depicts an example electrical connector backshell 200 for such a sealing process.

The back side of the connector 230 is positioned within the electrical connector backshell 200 and is sealed with a RTV sealant and allowed to cure. The electrical connector 230 is then coupled to one or more electrical wires and placed into a mold where the poly urethane is injected. In some implementations, a RTV sealant seals the connection of the one or more electrical wires to the connector 230 as well. The RTV stops or substantially prevents the polyurethane from entering the connector body 230 and/or the electrical connector backshell 200. The two part polyurethane cures or hardens and is ready for installation on the aftertreatment system. The final product is a wire harness that has all the connectors 230 and/or electrical connector backshells 200 sealed from the environment because of the added RTV within the connector 230. In other implementations, sealing materials other than RTV may be used to seal the connector 230, such as a sealant with a lower cure time for a faster manufacturing process.

IV. Example Variable Sizing

When a catalyst is canned during assembly, there may need to be a holding pressure applied to the catalyst. This pressure is exerted on the catalyst from the mat material that sits between the catalyst and the inner diameter of the body. The holding pressure is achieved by targeting a specific mat density, referred to as the Gap Bulk Density (GBD). As a result of targeting a GBD level, the final body diameter may vary for different manufactured parts. This final body diameter is a function of the catalyst diameter, mat weight, and GBD tolerance range. Due to this variation in body diameter, it may be difficult to design a component to mate with this body as some parts may not fit over the body, while others may have a gap that prevents or makes attachment more difficult, such as difficulty in welding to cover the gap properly. Mating two components over a canned substrate may be useful to reduce the overall length of the system.

Figure 6:
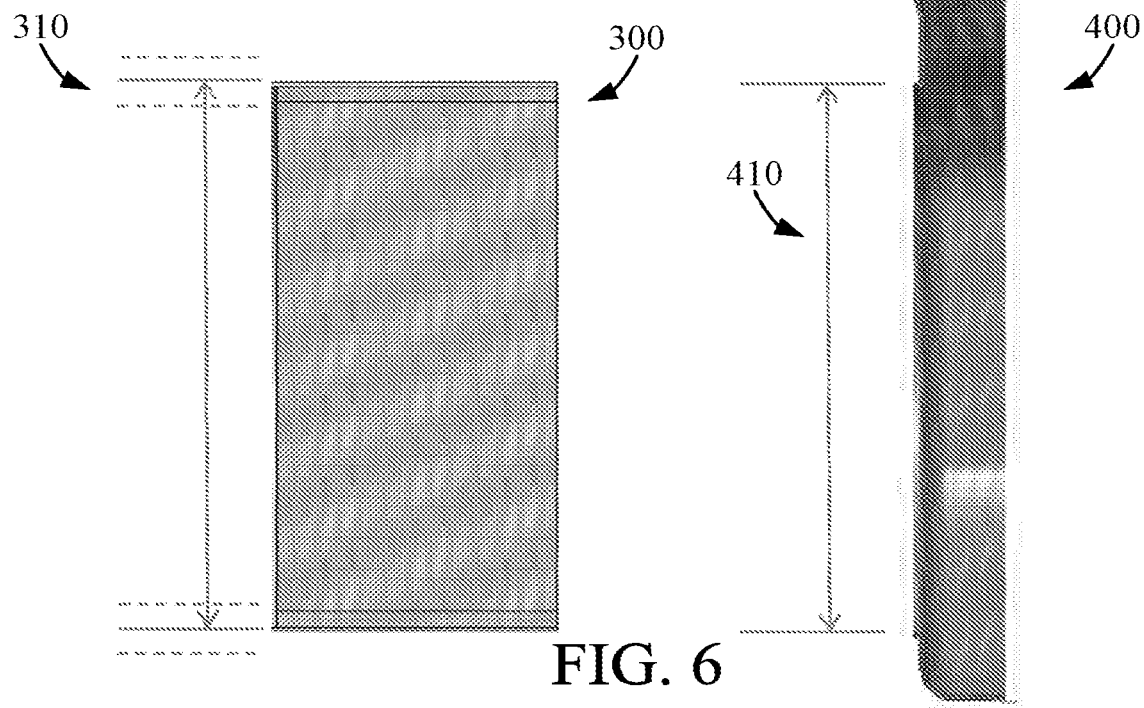
FIG. 6 is a schematic view of a catalyst component and a mating flange.
Figure 7:
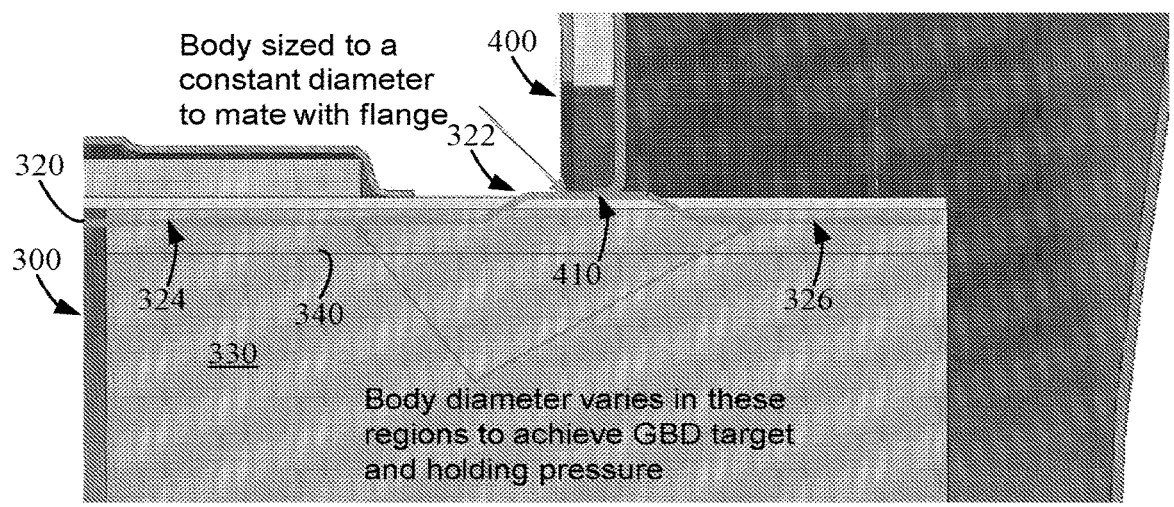
FIG. 7 is a partial side cross-sectional view of a catalyst component inserted into a mating flange with a variable diameter sizing.

FIGS. 6-7 depict a catalyst component 300 and a mating flange 400 where the catalyst component 300 may have a variable diameter sizing 310 and the mating flange 400 has a first constant diameter opening 410. As discussed above, the catalyst component may have a diameter 310 that varies (e.g., varying by approximately ±3.4 mm in tolerance). The diameter 310 of the catalyst component may vary as a function of the catalyst diameter, a mat weight, a GBD, etc. However, with a first constant diameter for the opening 410 of the mating flange 400, the varying catalyst component diameter may not properly align and/or fit into the opening 410 of the mating flange 400. Accordingly, it may be useful to size the diameter of the opening 410 of the mating flange 400 and a portion of the catalyst component 300 to have constant size regardless of the varying diameter of the rest of the catalyst component 300, as shown in FIG. 7.

As shown in FIG. 7, a casing of the aftertreatment system may include a mating flange 400 with a first constant diameter opening 410. The catalyst component 300 is configured to mate to the mating flange 400 of the casing by being inserted into the first constant diameter opening 410 of the mating flange 400. The catalyst component 300 includes a canned body 320 that has a first portion 322 sized to a second constant diameter to mate with the first constant diameter opening 410 of the mating flange 400 when the catalyst component 300 is inserted into the mating flange 400. The first portion 322 may be a substantially small portion of the canned body (e.g., 1-3 centimeters) relative to the length of the catalyst component 300. The catalyst component 300 includes a catalyst material 330 and a mat material 340 positioned within the canned body 320. The canned body 320 of the catalyst component 300 can be compressed, rolled, or otherwise reduced in diameter to form a second portion 324 sized to a third diameter, which is less than the second constant diameter. In some instances, the third diameter has a tolerance of ±3.4 mm. The third diameter can be based on a holding pressure exerted on the catalyst material 330 by the mat material 340 when compressed within the canned body 320. In some implementations, the holding pressure is based on a target Gap Bulk Density (GBD) for the mat material 340. In some implementations, the canned body 320 includes a third portion 326 also sized to the third diameter and the first portion 322 is positioned between the second portion 324 and the third portion 326.

Thus, the canned body 320 of the catalyst component 300 includes the first portion 322 as a region to which the mating flange 400 may be coupled based on the second contestant diameter of the first portion 322 and the first constant diameter opening 410 of the mating flange 400. Thus, sizing the canned body 320 of the catalyst component 300 to a constant diameter in the region where the canned body 320 joins the mating flange 400 may assist in aligning and properly fitting the catalyst component 300 to the mating flange 400. The remaining portion of the canned body 320 is then sized to the correct GBD target to ensure acceptable holding pressure is exerted on the catalyst material 330.

V. Example DPF Outlet Joint

Figure 8:
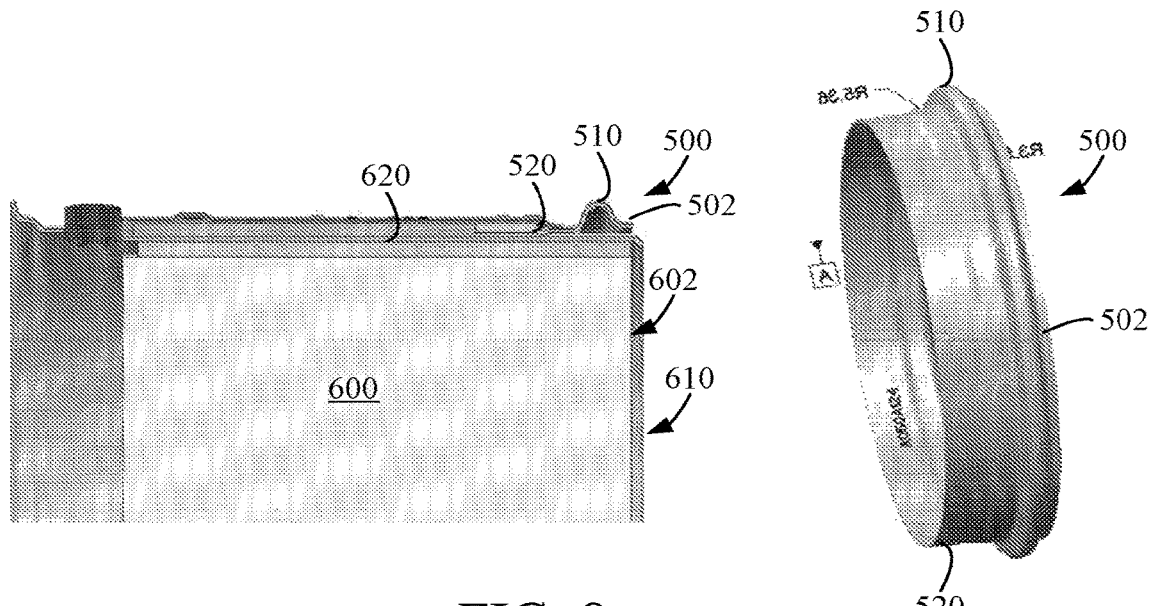
FIG. 8 is partial side cross-sectional view and perspective view of a separate joint ring for a DPF body.

FIG. 8 depicts an example separate joint ring 500 for a diesel particulate filter (DPF) 600. A body joint may be needed at an outlet 610 of the DPF 600 for coupling other components to the DPF 600, removing the DPF 600 for servicing, etc. However, an integrated joint may increase the overall length of the aftertreatment system because the integrated joint may extend beyond an end 602 of the DPF 600. Accordingly, it may be useful to create a separate diesel particulate filter joint 500 that has the joint geometry (e.g., beading) on it that may be attached to a DPF outer casing 620 to align an end 502 of the diesel particulate filter joint 500 with the end 602 of the DPF 600, thereby reducing the length of the overall aftertreatment system.

The diesel particulate filter joint 500 includes a bead 510 for coupling the DPF 600 to other components (e.g., via ring clamps or other attachment methods). The diesel particulate filter joint 500 further includes an attachment portion 520 for attaching the diesel particulate filter joint 500 to the DPF outer casing 620 once the end 502 of the diesel particulate filter joint 500 is aligned with the end 602 of the DPF 600. The attachment portion 520 of the diesel particulate filter joint 500 is welded to and over the DPF outer casing 620 to reduce the overall length of the DPF 600 by permitting the bead 510 of the diesel particulate filter joint 500 to be positioned over the DPF 600 without substantially adversely affecting the DPF material within the DPF outer casing 620. By locating the bead 510 over the DPF material, an overall length of an integrated aftertreatment system can be reduced relative to an integrated joint. Such a reduction in overall system length, either alone or in combination with other features described herein, may permit alternative orientations and/or placements of the aftertreatment system in a vehicle or other system.

VI. Example Flare Ring Coupling

Figure 9:
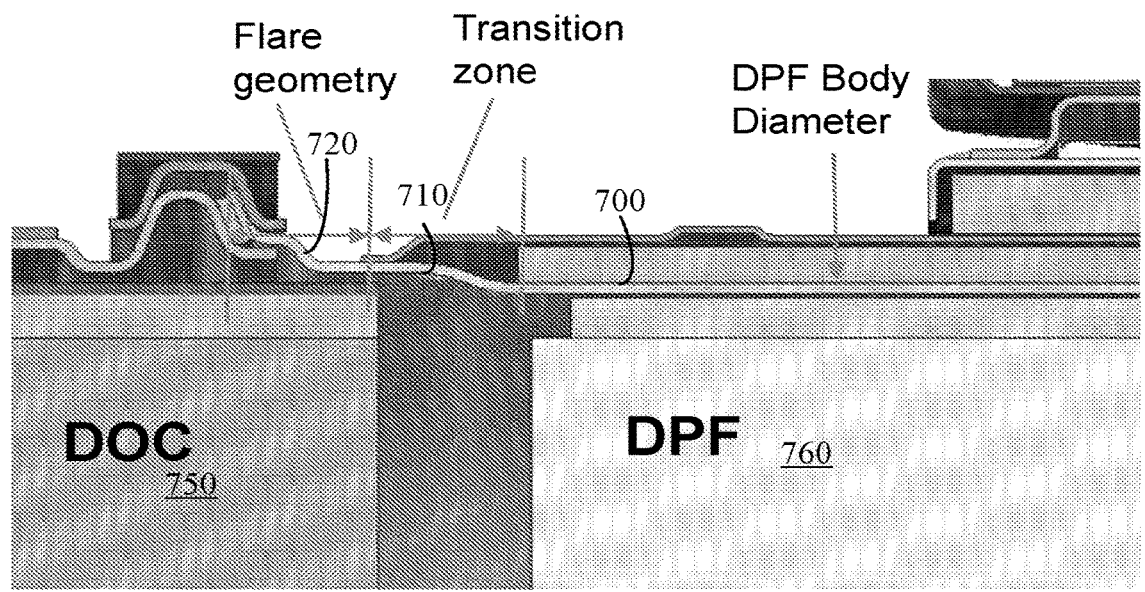
FIG. 9 is a partial side cross-sectional view of a DOC and DPF with a transition portion between the components.
Figure 10:
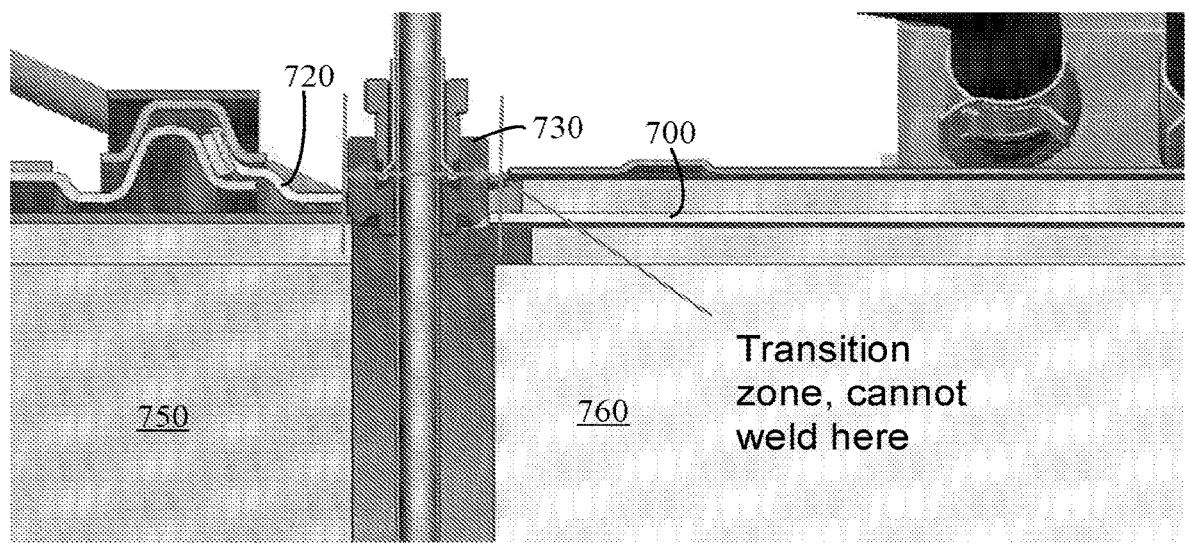
FIG. 10 is a partial side cross-sectional view of the DOC and DPF with a sensor positioned in the transition portion between the components.

FIGS. 9-10 depict an example transition portion 710 of an outer casing 700 between a diesel oxidation catalyst (DOC) 750 and a diesel particulate filter (DPF) 760 where the outer casing 710 changes in diameter from the DOC 750 to the DPF 760, such as the flare geometry 720 shown in FIGS. 9-10. Due to the compact nature of an integrated aftertreatment system, high pressure and temperature couplings 730 may need to be located in the transition portion 710 of the outer casing 700, which is the area where the body diameter varies from a smaller diameter over the catalyst to a larger diameter at the body flare profile between the DOC 750 and DPF 760. However, because of the varying diameter in the transition portion 710, it may be difficult to attach the pressure and/or temperature coupling 730 during manufacture, such as difficulty in obtaining a good weld, due to the curvature of the transition portion 710. That is, because the size of the transition portion 710 may vary for different manufactured parts, it may be difficult to obtain a consistent weld between the couplings 730 and the outer casing 700.

Figure 11:
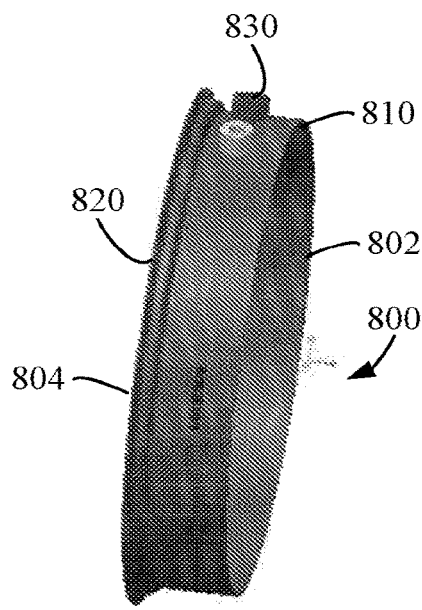
FIG. 11 is a perspective view of a separate flared ring having a constant diameter for the sensor to be inserted into the transition portion.
Figure 12:
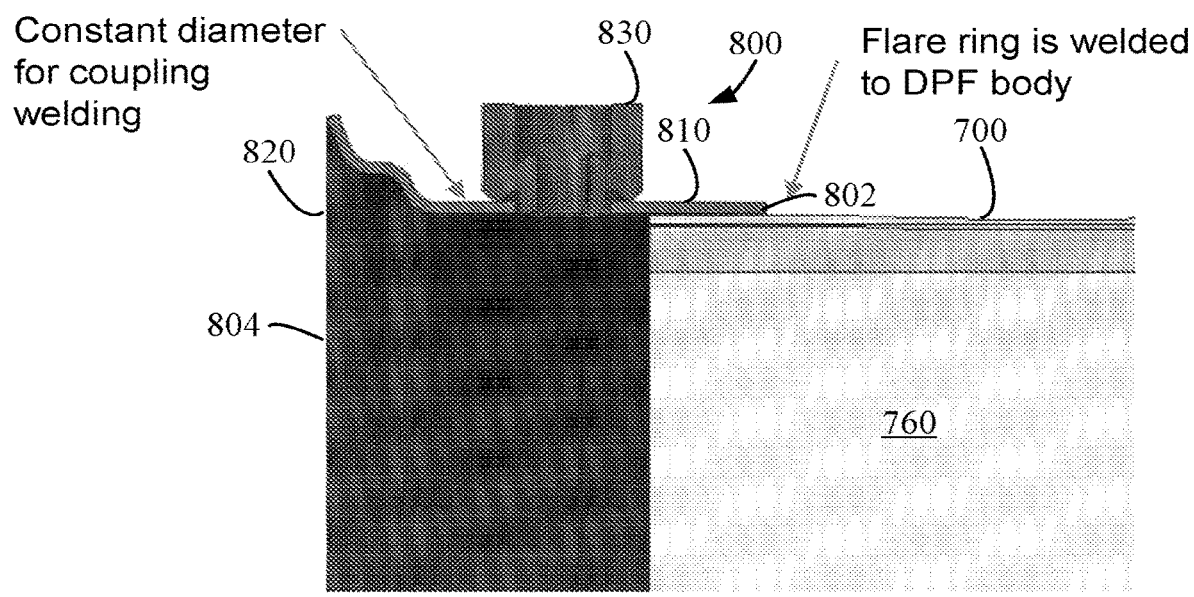
FIG. 12 is a perspective view of the separate flared ring attached to the DPF body.

FIGS. 11-12 depict an example flared ring 800 having a constant diameter for a sensor coupling 830 to be attached. The flared ring 800 has a constant diameter portion 810 to which the sensor coupling 830 is coupled and/or fixed. The sensor coupling 830 may be welded and/or otherwise fixedly coupled to the constant diameter portion 810. The flared ring 800 includes a flared portion 820 to transition to a larger diameter for a downstream component and/or to be attached to the larger diameter downstream component. A first component, such as the DPF 760, can be positioned within a first casing, such as casing 700. The flared ring 800 can then be fixedly coupled to the first casing at a first end 802 of the flared ring 800. The constant diameter portion 810 of the flared ring 800 extends from the first end 802 to a flared portion 820 at a second end 804 of the flared ring 800. In some implementations, the first end 802 of the flared ring 800 is welded to an outer portion of the first casing, such as a DPF body, to provide the sensor coupling 830 and the attachment flare of the flared portion 820 for coupling to a second casing having a second component positioned within the second casing, such as an upstream DOC 750. In some implementations, the sensor coupling is a pressure and/or temperature coupling. The flared ring 800 resolves the difficulty in attaching the sensor coupling 830 by allowing the coupling to be welded to a flat, consistent body of the flared ring 800. The flared ring 800 with the attached coupling subassembly is then welded to the canned DPF body in a final procedure.

VII. Example Integrated Sensor Harness and Module Alignment Component

In some situations, exhaust aftertreatment systems are a combination of multiple modules that contain catalyst coated substrates or mixers where exhaust reagents are introduced. Furthermore, those modules may have various sensors mounted on the external housing. In order to minimize manufacturing operations at a vehicle assembly plant, these aftertreatment system sensors may be connected by a harness with a single point for vehicle wiring harness connection.

Figure 13:
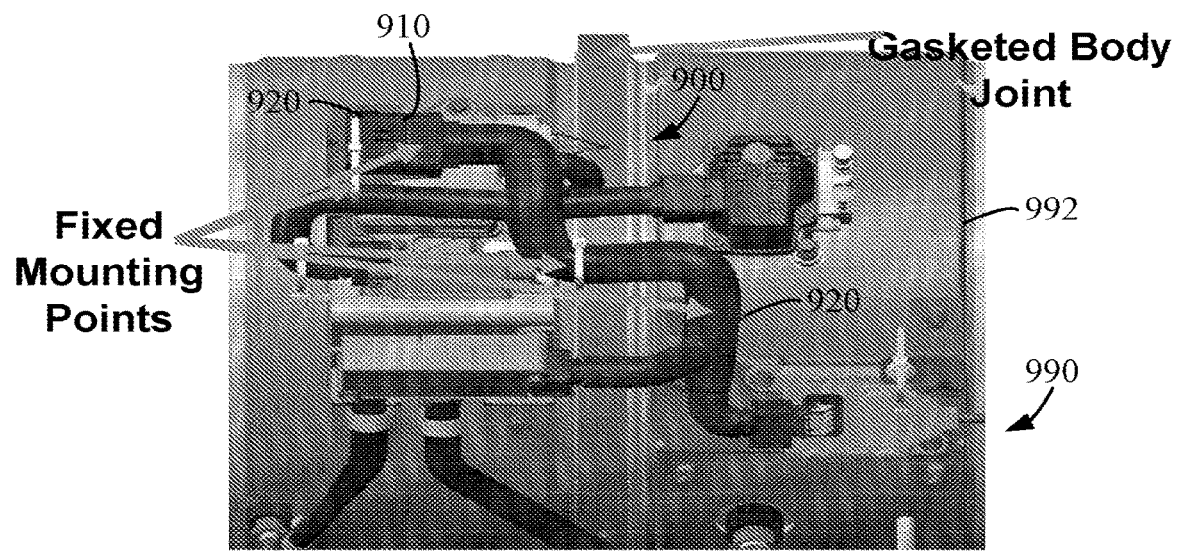
FIG. 13 is a side elevation view of an integrated sensor harness and module alignment component.
Figure 14:
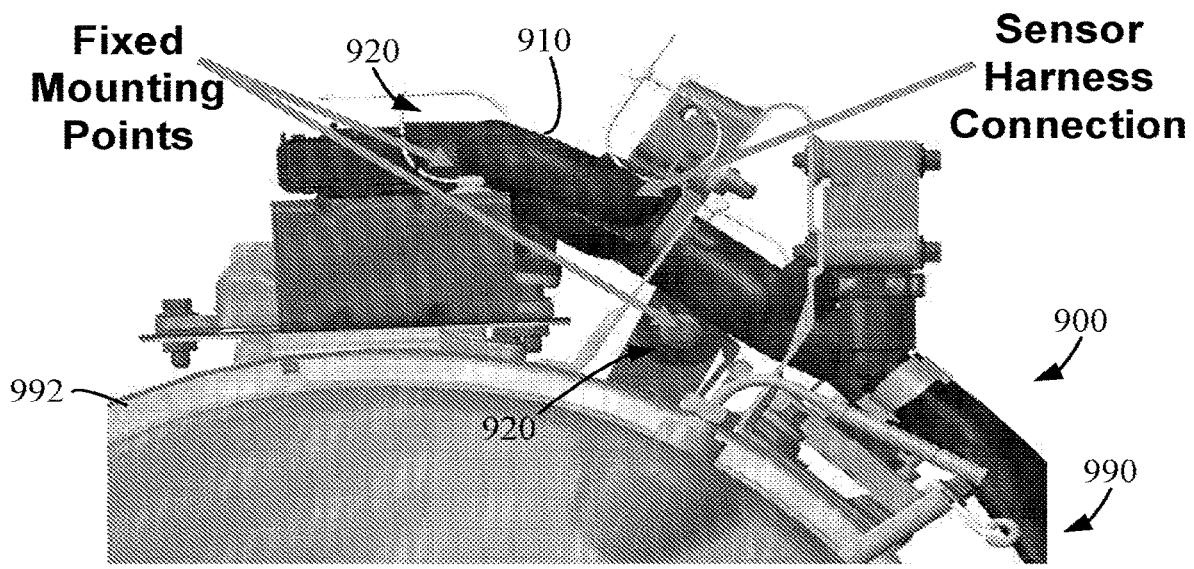
FIG. 14 is a front elevation view of the integrated sensor harness and module alignment component of FIG. 13.

FIGS. 13-14 depict an example integrated sensor harness and module alignment component 900 coupled to a casing 992 of an integrated aftertreatment system 990 having a catalyst positioned within the casing 992. The integrated sensor harness and module alignment component 900 may operate as a sensor mount that is coupled to the casing 992 of the integrated aftertreatment system 990. The integrated sensor harness and module alignment component 900 offers a low cost, robust solution without adding extra components to an aftertreatment system. The integrated sensor harness and module alignment component 900 effectively aligns components while minimizing secondary operations by assembly personnel and service technicians.

The integrated sensor harness and module alignment component 900 integrates a sensor harness 910 with rigid clipping points 920 on different parts of an aftertreatment system. These clipping points 920 on a rigid section of the sensor harness 910 allow positive alignment of aftertreatment system modules and properly locate sensor mounting brackets.

The harness 910 of the integrated sensor harness and module alignment component 900 may be comprised of bare wire, plastic conduit, chloroplast tape or polyurethane foam. In order to facilitate connections to the sensor, certain sections of the sensor harness 910 may be flexible enough to easily insert into the sensor. Furthermore, if sensors are mounted on various parts of the aftertreatment system, it may be advantageous to control the relative location of the various sensor mounting brackets in order for them to be as close to nominal location as possible. The integrated sensor harness and module alignment component 900 incorporates a rigid section of the sensor harness 910 and fixed mounting points 920 on the various sensor tables in order to control the axial and radial location of the sensors, harness, and brackets. These fixed mounting points 920 may include options such as zip ties or metal p-clips bolted on to brackets to affix the integrated sensor harness and module alignment component 900 to the casing 992 and/or other mounting feature.

VIII. Example Stackable Sensor Mount

Figure 15:
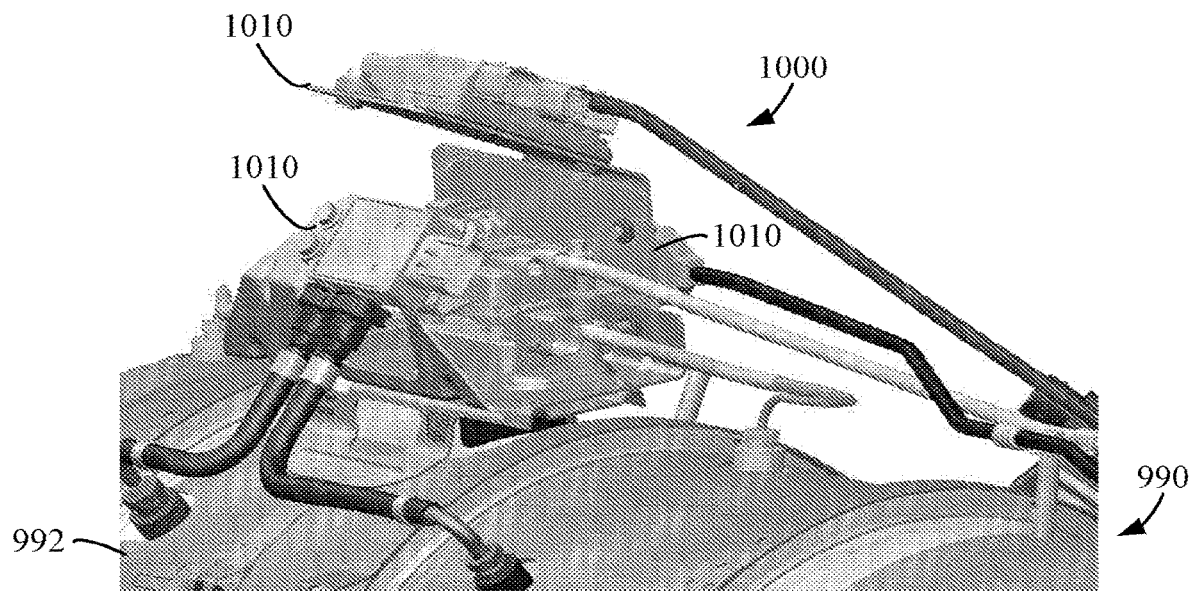
FIG. 15 is a perspective view of a stackable sensor mount.
Figure 16:
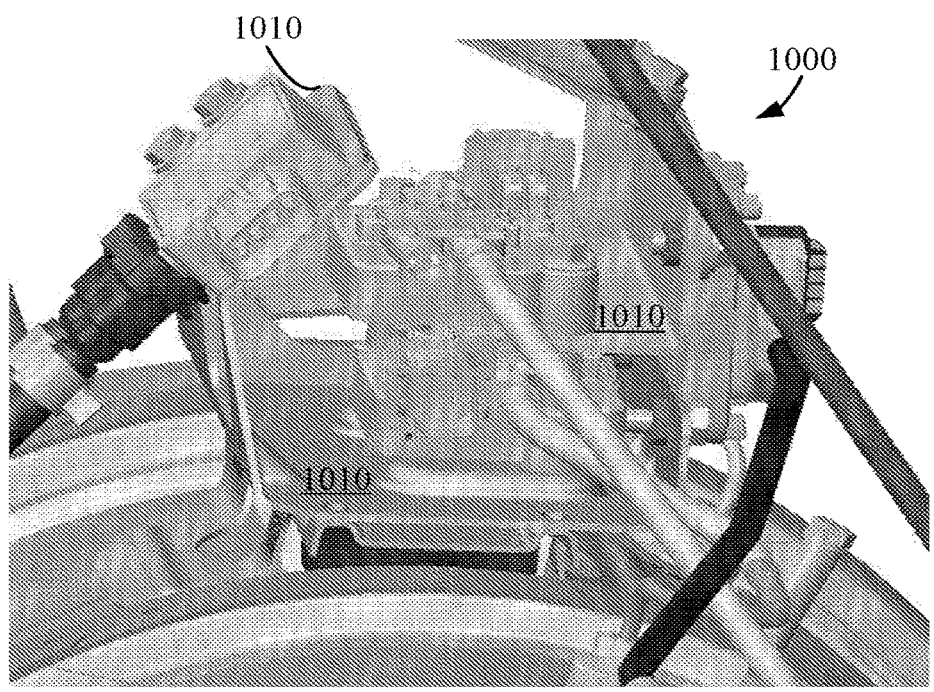
FIG. 16 is a front elevation view of the stackable sensor mount of FIG. 15.

FIGS. 15-16 depict an example stackable sensor mount 1000 coupled to a casing 992 of an integrated aftertreatment system 990 having a catalyst positioned within the casing 992. The stackable sensor mount 1000 includes one or more sensor mounting plates 1010 that may be tiered and/or oriented in any spatial orientation to accommodate one or more sensor modules. The sensor mounting plates 1010 can include two or more tiers such that multiple sensor modules may be mounted to the casing 992 of the integrated aftertreatment system 990 at a single location. By stacking the sensor modules in multiple tiers using the sensor mounting plates 1010, the footprint of required space for mounting sensor modules for the integrated aftertreatment system 990 may be reduced.

IX. Example Combination Bolt and/or Strap Mounted Sensor Table

Figure 17:
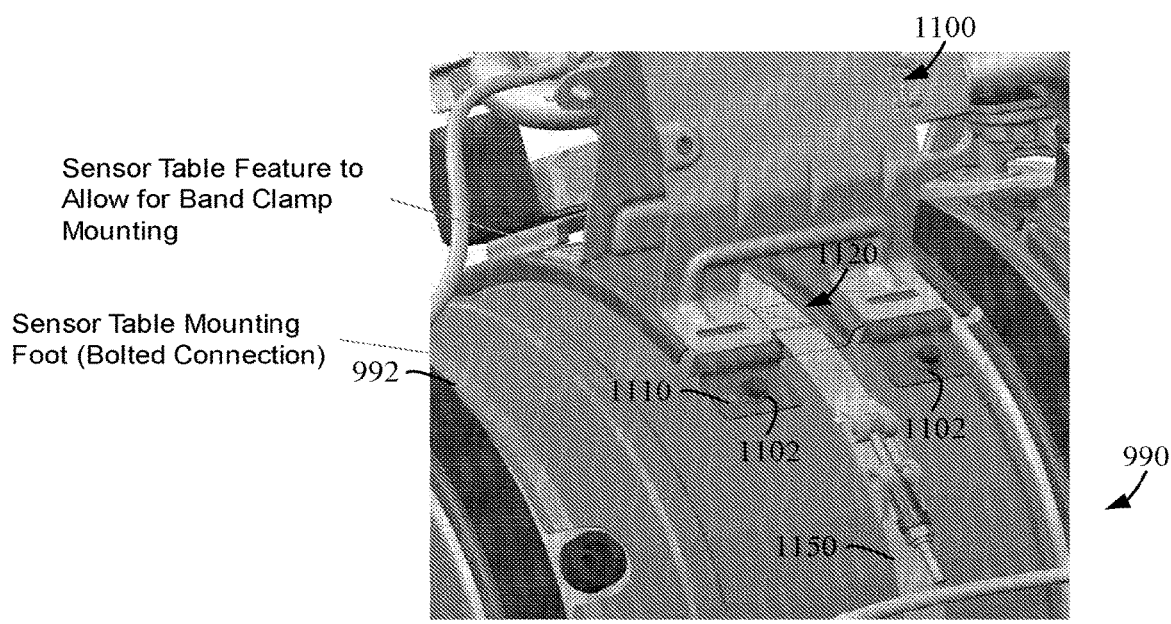
FIG. 17 is a perspective view of a combination bolt and/or strap mounted sensor table.
Figure 18:
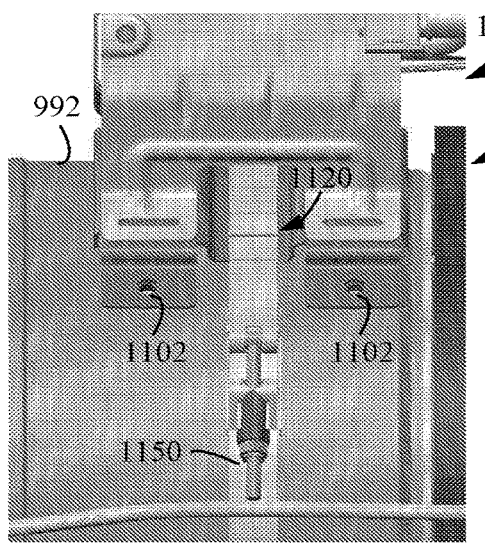
FIG. 18 is a perspective view of the combination bolt and/or strap mounted sensor table attached via a strap.
Figure 19:
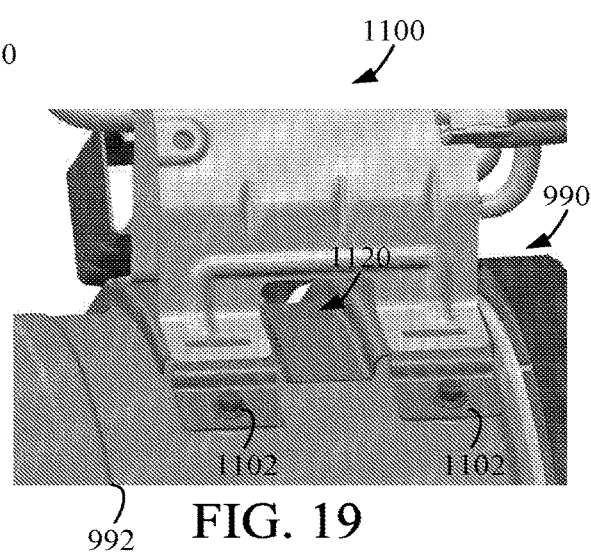
FIG. 19 is a perspective view of the combination bolt and/or strap mounted sensor table attached via bolts.

FIGS. 17-19 depict an example combination bolt and/or strap mounted sensor table 1100. The combination bolt and/or strap mounted sensor table 1100 includes four bolt holes 1102 on four legs 1110 that can be used with regular bolts to mount the combination bolt and/or strap mounted sensor table 1100 on a casing 992 of an integrated aftertreatment system 990 having a catalyst positioned within the casing 992. In addition, the combination bolt and/or strap mounted sensor table 1100 includes a channel 1120 located at the bottom of the sensor table 1100 to allow a band-clamp 1150 to be securely attached to mount the sensor table 1100 on the casing 992 of the integrated aftertreatment system 990. In some implementations, both the bolts and the band-clamp may be used to attach the sensor table 1100 to the integrated aftertreatment system 990.

X. Example Tapered Pressure Sensor Tube

Figure 20:
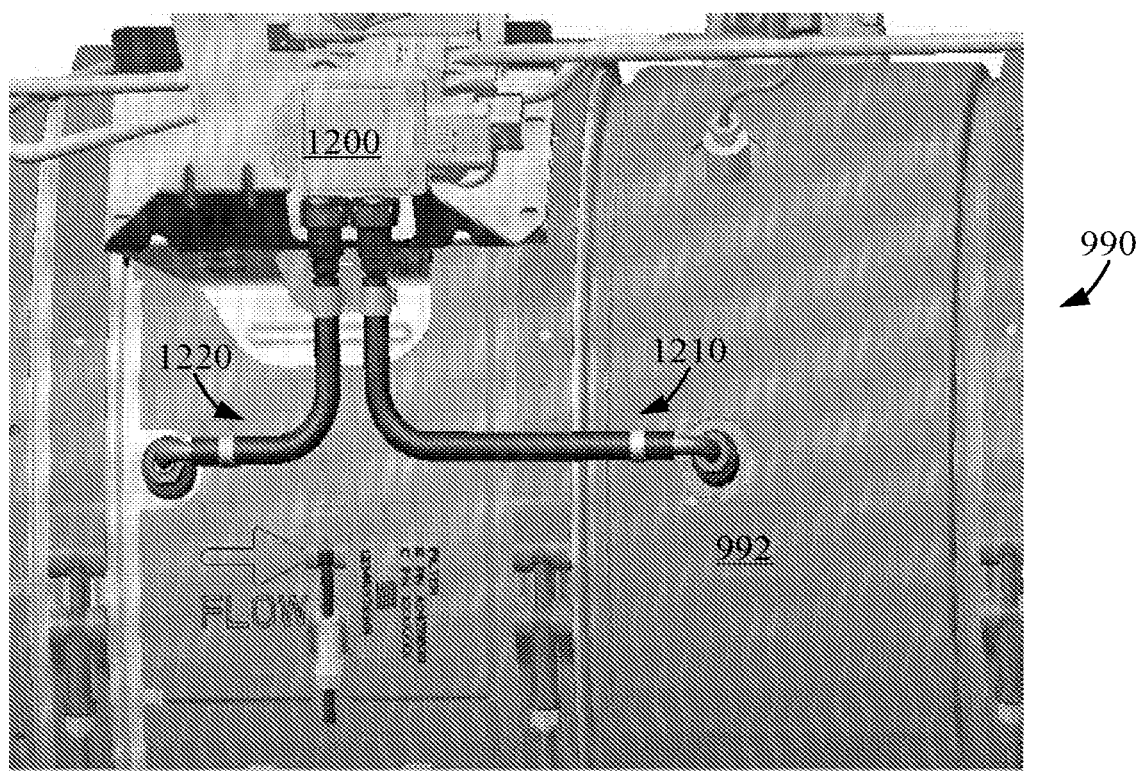
FIG. 20 is a side elevation view of a pressure sensor tube configuration.

FIG. 20 depicts an example pressure sensor assembly having a pressure sensor 1200 with pressure tubes 1210, 1220 extending from a pressure sampling module of a casing 992 of an integrated aftertreatment system 990 having a catalyst positioned within the casing 992. A diameter of the pressure tubes 1210, 1220 for the pressure sensor 1200 may be constant. These constant diameter tubes 1210, 1220 (e.g., 7.94 mm inner diameter) may not sufficiently drain out water that may condense in the tube. The water that condenses in the tubes 1210, 1220 may freeze and potentially completely block the tubes 1210, 1220, thereby rendering the tubes 1210, 1220 incapable of correctly reading the exhaust pressure, deforming the tubes 1210, 1220, rupturing the tubes 1210, 1220, and/or cause other problems with the tubes 1210, 1220.

Figure 21:
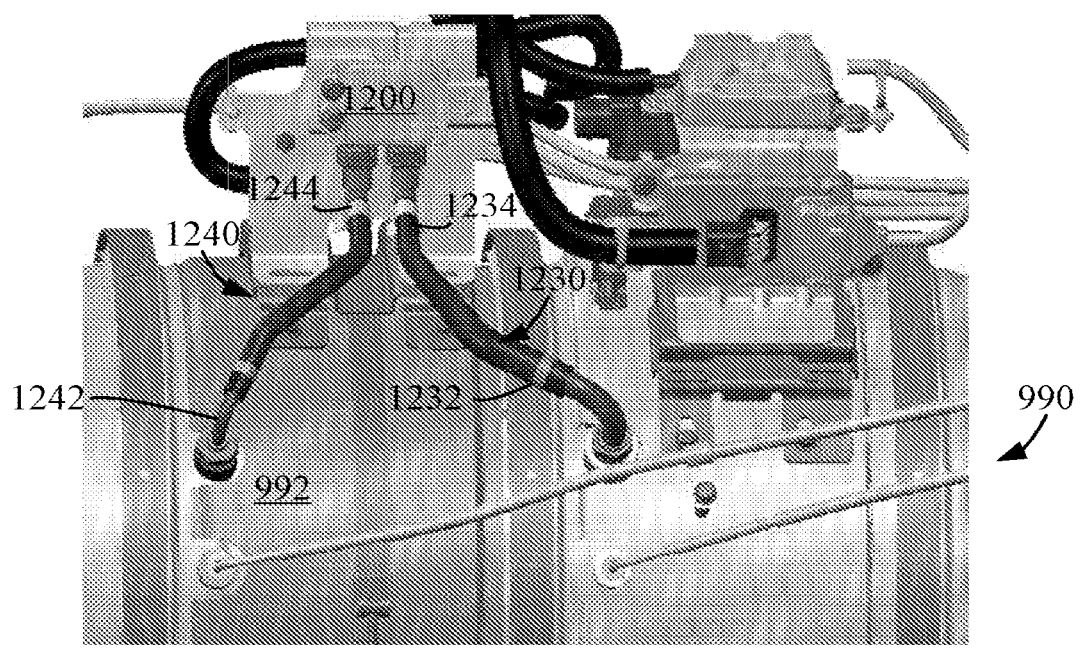
FIG. 21 is a perspective view of a tapered pressure sensor tube configuration.

FIG. 21 depicts an example pressure sensor 1200 with a tapered diameter for the pressure tubes 1230, 1240. The tapered pressure tubes 1230, 1240 include a first end 1232, 1242 having a larger diameter near the integrated aftertreatment system 990, which allows for increased water drainage out of the tapered tubes 1230, 1240. The tapered pressure tubes 1230, 1240 include a second end 1234, 1244 near the pressure sensor 1200 that have a smaller diameter to allow the tubes 1230, 1240 to be connected to the pressure sensor 1200. The tapered pressure tubes' 1230, 1240 diameter is smaller (e.g., 7.94 mm inner diameter) at the second ends 1234, 1244 to mate with a delta pressure sensor 1200 while the tapered pressure tubes' 1230, 1240 diameter is larger at the opposing first end 1232, 1242 (e.g., 13.9 mm inner diameter) to enable better water drainage out of the tubes 1230, 1240.

XI. Example Mold for Sealing an Electrical Connector

Figure 22:
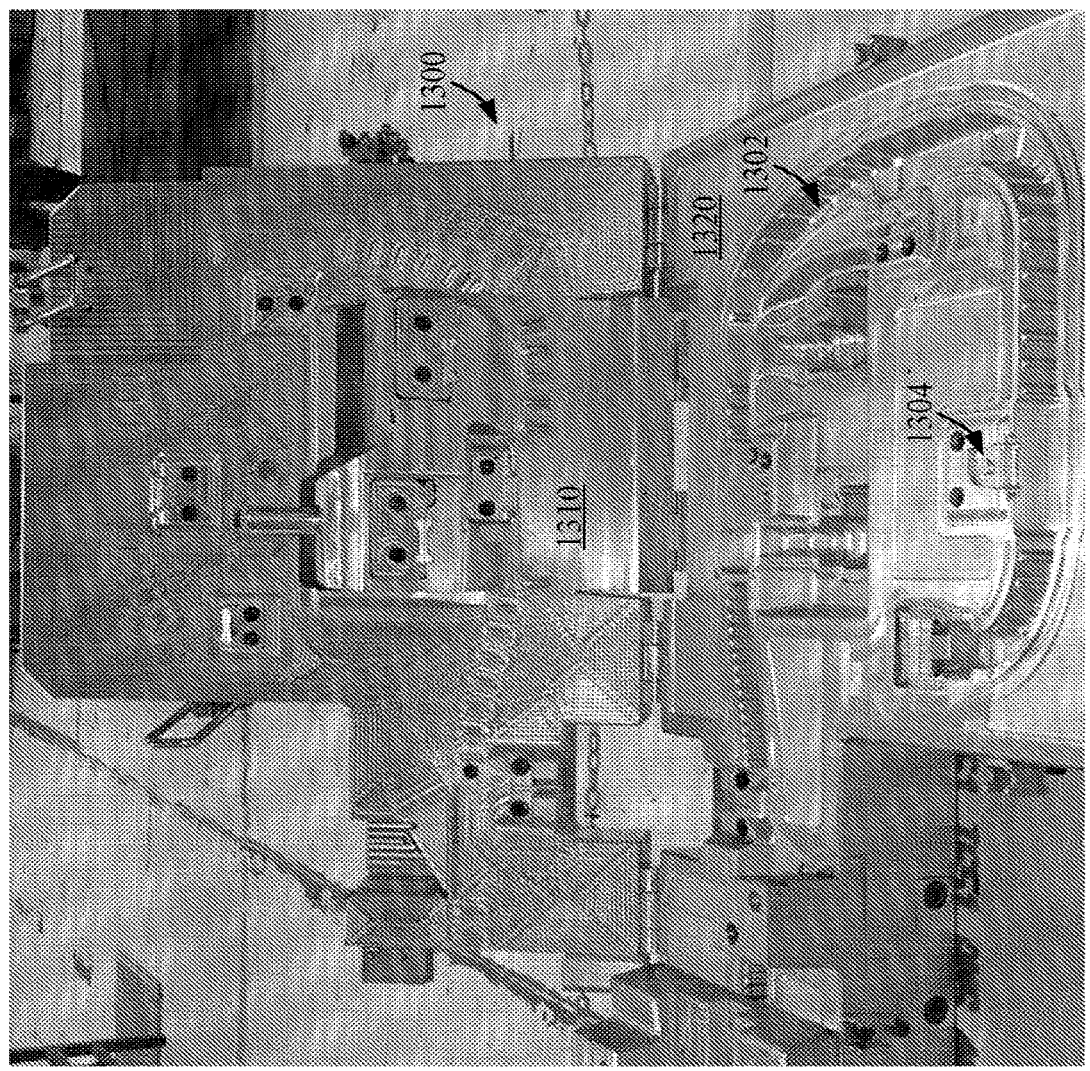
FIG. 22 is a perspective view of a mold for sealing an electrical connector from a curing mold material.

FIG. 22 depicts an example mold 1300 for sealing an electrical connector from a curing mold material. The mold 1300 includes an upper mold portion 1310 and a lower mold portion 1320 such that, when the upper mold portion 1310 is closed and sealed to the lower mold portion 1320, polyurethane, such as a two part elastofoam and elastocast, foam material can be injected as a two part liquid into the mold 1300 to form a cover for a wiring harness to isolates contacts of a connector, such as connector 230 of FIG. 2, from the environment. In some implementations, BASF 2 part elastofoam 4610/101 Resin and/or elastocast 70604T Isocyanate may be used.

Figure 23B:
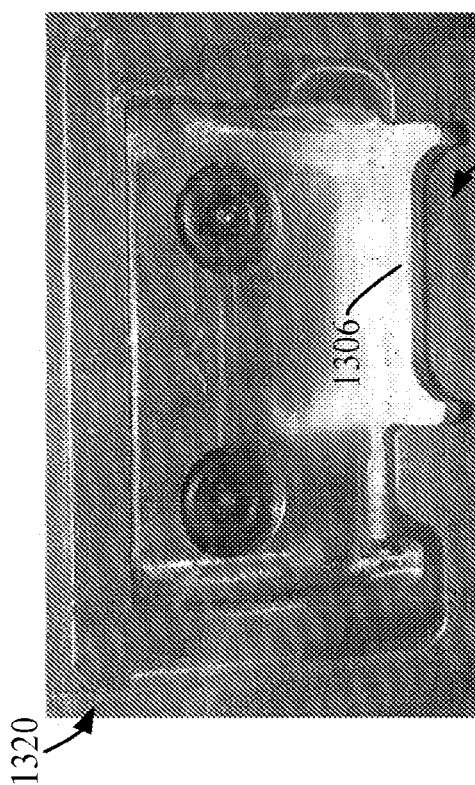
FIG. 23B is a perspective view of a lower removable component for the mold of FIG. 22 having a lower lip.
Figure 23A:
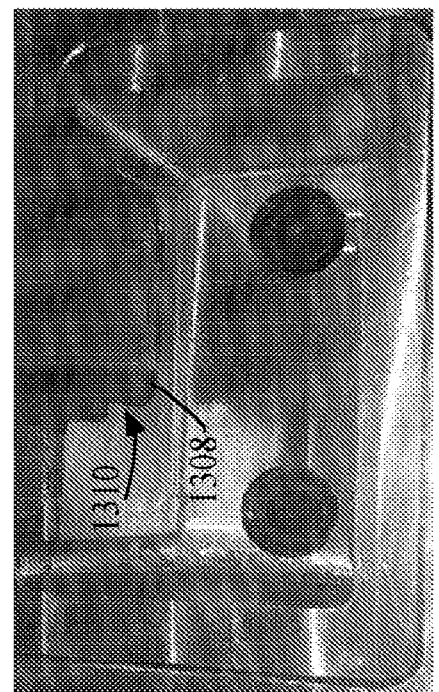
FIG. 23A is a perspective view of an upper removable component for the mold of FIG. 22 having an upper lip.

The mold 1300 defines a first cavity 1302 to accommodate one or more electrical wires, such as electrical wires 240, and a second cavity 1304 to accommodate an electrical connector backshell, such as electrical connector backshell 200, and/or electrical connector, such as electrical connector 230. As shown best in FIGS. 23A and 23B, the second cavity 1304 includes an upper lip 1306 and a lower lip 1308 to form a small tolerance opening 1310 between the first cavity 1302 and the second cavity 1304 when the mold 1300 is closed and the one or more electrical wires are coupled to the electrical connector of the electrical connector backshell. The second cavity 1304 is formed from an upper removable component 1320 of FIG. 23A and a lower removable component 1330 of FIG. 23B. The upper removable component 1320 includes the upper lip 1306 and the lower removable component 1330 including the lower lip 1308. In some implementations, the upper removable component 1320 and the lower removable component 1330 may be bolted or otherwise removably attached to the mold 1300 such that the upper removable component 1320 and the lower removable component 1330 may be replaced. For instance, if the upper lip 1306 or lower lip 1308 loses the small tolerance for the small tolerance opening 1310, then the upper removable component 1320 or lower removable component 1330 can be removed and replaced.

When the electrical harness is to be formed, the electrical connector is placed in the second cavity 1304 of the mold 1300. The upper lip 1306 and lower lip 1308 form a tight tolerance with the electrical wires extending therethrough and substantially seals the back side of the connector from polyurethane foam entering and contaminating the connector. In such implementations, a sealed electrical harness can be formed without sealing the backside of the connectors with RTV or a similar sealing product, thereby reducing manufacturing time and eliminating error for high volume production. However, in some implementations, RTV or a similar sealing product may also still be used to further seal the electrical connector.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An integrated aftertreatment system comprising:
a first casing;
a first component positioned within the first casing;
a second casing;
a second component positioned within the second casing; and
a flared ring fixedly coupled to the first casing at a first end and coupled to the second casing at a second end opposite the first end, the flared ring having a constant diameter portion extending from the first end to a flared portion at the second end, the flared ring including a sensor coupling fixed to the constant diameter portion.

2. The integrated aftertreatment system of claim 1, wherein the sensor coupling comprises a pressure coupling or a temperature coupling.

3. The integrated aftertreatment system of claim 1, wherein the first component is a diesel oxidation catalyst and the second component is a particulate filter.

4. The integrated aftertreatment system of claim 1, wherein the flared ring is welded to an outer portion of the first casing.

5. A flared ring for an exhaust gas aftertreatment system, the flared ring comprising:
    a cylindrical portion centered on a center axis, the cylindrical portion defined by a first length along the center axis;
    a flared portion extending outward from the cylindrical portion away from the center axis, the flared portion defined by a second length along the center axis, the second length less than the first length; and
    a sensor coupling configured to be coupled to a sensor;
    wherein the cylindrical portion comprises an aperture configured to receive the sensor coupling; and
    wherein the sensor coupling is positioned within the aperture and coupled to the cylindrical portion.

6. The flared ring of claim 5, wherein:
    the flared portion is configured to extend around a diesel oxidation catalyst; and
    the cylindrical portion is configured to extend around a diesel particulate filter.

7. The flared ring of claim 5, wherein the flared portion is structurally integrated with the cylindrical portion.

8. The flared ring of claim 7, wherein the cylindrical portion and the flared portion are metallic.

9. The flared ring of claim 5, wherein:
    the cylindrical portion has a first thickness; and
    the first thickness is constant along the first length.

10. The flared ring of claim 9, wherein:
    the flared portion has a second thickness; and
    the second thickness is constant along the second length.

11. The flared ring of claim 10, wherein the second thickness is equal to the first thickness.

12. The flared ring of claim 5, wherein the flared portion comprises:
    a first portion contiguous with the cylindrical portion, the first portion extending axially from the cylindrical portion and radially from the cylindrical portion away from the center axis;
    a second portion contiguous with the first portion and separated from the cylindrical portion by the first portion, the second portion extending axially away from the first portion; and
    a third portion contiguous with the second portion and separated from the first portion by the second portion, the third portion extending axially from the second portion and radially from the second portion away from the center axis.

13. The flared ring of claim 12, wherein:
    the first portion is defined by a third length along the center axis;
    the second portion is defined by a fourth length along the center axis, the fourth length greater than the third length; and
    the third portion is defined by a fifth length along the center axis, the fifth length less than the fourth length.

14. The flared ring of claim 12, wherein the second portion does not extend radially from the first portion away from the center axis.

15. The flared ring of claim 12, wherein:
    the second portion extends from the first portion towards the center axis; and
    the third portion extends from the second portion away from the center axis.

16. An exhaust gas aftertreatment system comprising:
    a first casing having a first diameter;
    a second casing having a second diameter less than the first diameter; and
    a flared ring comprising:
        a cylindrical portion centered on a center axis, the cylindrical portion welded to the second casing;
        a flared portion extending outward from the cylindrical portion away from the center axis, the flared portion welded to the first casing; and
        a sensor coupling configured to be coupled to a sensor;
    wherein the cylindrical portion comprises an aperture configured to receive the sensor coupling, the aperture disposed between the first casing and the flared portion; and
    wherein the sensor coupling is positioned within the aperture and coupled to the cylindrical portion.

17. The exhaust gas aftertreatment system of claim 16, wherein:
    the cylindrical portion is defined by a first length along the center axis; and
    the flared portion is defined by a second length along the center axis, the second length less than the first length.

18. The exhaust gas aftertreatment system of claim 16, wherein:
    the flared portion is structurally integrated with the cylindrical portion; and
    the cylindrical portion and the flared portion are metallic.

19. The exhaust gas aftertreatment system of claim 16, wherein the flared portion comprises:
    a first portion contiguous with the cylindrical portion, the first portion extending outward from the cylindrical portion away from the center axis;
    a second portion contiguous with the first portion and separated from the cylindrical portion by the first portion, the second portion extending axially away from the first portion; and
    a third portion contiguous with the second portion and separated from the first portion by the second portion, the third portion extending outward from the second portion away from the center axis.

20. The exhaust gas aftertreatment system of claim 19, wherein:
    the first portion is defined by a third length along the center axis;
    the second portion is defined by a fourth length along the center axis, the fourth length greater than the third length;
    the third portion is defined by a fifth length along the center axis, the fifth length less than the fourth length;
    the second portion does not extend radially from the first portion away from the center axis the second portion extends from the first portion towards the center axis; and
    the third portion extends from the second portion away from the center axis.

* * * * *